United States Patent [19]

Manniso et al.

[11] Patent Number: 4,878,930
[45] Date of Patent: Nov. 7, 1989

[54] FILTER CARTRIDGE

[75] Inventors: James L. Manniso, Newark; Eugene W. Sieber, Bear; Glenn R. Voshell, Newark, all of Del.

[73] Assignee: W. L. Gore & Associates, Inc., Newark, Del.

[21] Appl. No.: 589,731

[22] Filed: Mar. 15, 1984

[51] Int. Cl.$^4$ .......................................... B01D 27/06
[52] U.S. Cl. ...................................... 55/493; 55/498; 55/501; 55/521; 210/321.82; 210/484; 210/493.2; 210/493.5; 210/500.36
[58] Field of Search ................. 55/493, 483, 485, 497, 55/500, 501, 521, 498, DIG. 2, DIG. 5; 210/483–485, 493.1, 493.2, 493.5, 321.82, 500.36

[56] References Cited

U.S. PATENT DOCUMENTS

| | | | |
|---|---|---|---|
| 1,322,378 | 11/1919 | Vaughan | 210/485 |
| 3,177,637 | 4/1965 | Davis | 55/483 |
| 3,326,382 | 1/1967 | Bozek et al. | 210/484 |
| 3,486,626 | 12/1969 | Close | 55/498 |
| 3,679,537 | 7/1972 | Huer et al. | 55/521 |
| 4,007,026 | 2/1977 | Groh | 55/498 |
| 4,363,643 | 12/1982 | Elbrader et al. | 55/500 |

OTHER PUBLICATIONS

PCT WO83/03364, published 13 Oct. 1983.

Primary Examiner—Richard V. Fisher
Attorney, Agent, or Firm—Gary A. Samuels

[57] ABSTRACT

A filter cartridge for removing particles or dust from a stream of moving gas or air, including a filter medium disposed between a pleated inner wire support frame, outer longitudinal wire support stays disposed along each inner apex of the pleats of the filter medium, and end caps. The outer wire stays are formed from inwardly bent wires which attach at each end to the inner frame and exert pressure on the filter medium to support it against inner pressure of a pulse jet cleaning device. Preferred filter media are felt or fabric composites containing a layer of porous expanded polytetrafluoroethylene membrane. A preferred form of lower end cap has the periphery contoured to conform to the configuration of the filter medium and inner support frame. The cartridge structure is advantageous in preventing build-up of ledges of dust on protuberances, with consequent reduction of filter efficiency.

9 Claims, 3 Drawing Sheets

FILTER CARTRIDGE

BACKGROUND OF THE INVENTION

1. FIELD OF THE INVENTION

This invention relates to cartridge filters for use in filter systems designed to remove solid particles or dust from large volumes of gases, including air, in which they are suspended, such as industrial sweepers, bag houses, plenum type dust collectors, and the like. These systems rely on a plurality of filter devices which embody a porous filter material through which the gaseous medium passes, the solids being retained on the upstream surface of the filter medium as the gases pass through. The separated solids build up on the upstream side of the filter medium with time and must be removed before the thickness of the accumulated solids layer causes excessive pressure drop. In current practice, the filter cake is dislodged from the filter elements by means of a pulse of compressed air admitted to the filter element, a reverse air flow, or a shaker mechanism. The filter medium flexes under the force of the air pulse to dislodge the filter cake and the flow of gases being filtered is maintained while such flexing and dislodging is taking place. The improved cartridge filter of the invention is intended for use with such devices and methods of cleaning, in particular the pulse jet cleaning method.

2. DESCRIPTION OF THE PRIOR ART

Cartridge filters per se are well known in the art for both gaseous and liquid filtration and have the usual construction of a folded or pleated filter medium arranged cylindrically around a perforated cylindrical supporting member or tube. The filter medium may be optionally surrounded by a perforated cylindrical supporting member, such as a perforated tube. The supporting tubes and filter medium are adhered to end caps which prevent leakage around the filter medium and provide support for the filter medium and the other components.

Examples of such cartridges are found in the Parker patent, U.S. Pat. No. 2,739,916, where thermoplastic resin plastisol is used to bond, seal, or pot the ends of the pleated filter medium and supporting members in a layer of resin plastisol in the end caps. Mumby, in U.S. Pat. No. 3,392,843, describes a disposable cartridge, including a paper filter medium, where the outer edges of the pleats are indented at certain points to form a surface for disposing a filter reinforcing adhesive to space adjacent pleats apart from one another to form better inlets for fluid to be filtered to the filter medium. A knock-down filter was shown by Frosolone, in U.S. Pat. No. 3,498,464, wherein a pleated paper medium was used to filter organic solvents. A dual-stage cartridge was provided by Reading, in U.S. Pat. No. 3,552,553, where a foamlike material comprised the first stage filter medium which surrounded a pleated paper or felt-like second stage filter medium. Groh, in U.S. Pat. No. 4,007,026, in filters for an industrial sweeper apparatus, utilizes a pleated paper filter surrounding a cylindrical coiled spring inner support with restraining bands around the outside of the filter medium to resist the force of the air pulse jet cleaning action on the filter medium.

A web, frame, or grid of wire supports has been used to support filter media against the pressure of a gas being filtered. Boothe, U.S. Pat. No. 3,853,529, provided in flat disposable cartridge form a pleated wire frame on the downstream side of the filter medium and coated the wires of the web with an adhesive to both protect the wire against corrosion and to bond to the filter medium to prevent its billowing in the gaps between the wires of the support frame under the pressure of the stream of air being filtered. Rudin, U.S. Pat. No. 3,933,452, also folded a filter medium and wire support frame into a bellows shape in a plastic frame cartridge. Successive folds of the wire frame and filter medium were held apart by projections from the wire frame of one fold extending across to the frame wires of the adjacent fold.

Huber and Meier, U.S. Pat. No. 3,679,537, utilized wires disposed on both sides of strips of column packing element for materials exchange columns with the wires spot welded together into a frame to hold the packing in place.

A very simple way to hold a pleated filter medium across a gas steam was provided by Giocovas, in U.S. Pat. No. 4,004,899, by bending a fiber strand (wire) into a series of parallel longitudinal portions disposed in two parallel planes connected by intervening lateral wire sections and weaving the filter medium back and forth between alternating wires disposed in the two parallel planes to give pleats supported on the inside of each apex by one of the longitudinal wires from one or the other of each of the alternating planes of wires.

The problems of support of a filter medium on both sides against gas flow pressures was addressed by Leliaert in U.S. Pat. No. 3,853,509. A filter bag was supported between inner and outer wire cages of conforming star-shaped cross-section to which the filter bag conformed. The outer support cage circumferential wires, however, also provided many locations where dust could settle or form into piles which could partially block the active filter surface and result in a more rapid pressure drop than might be otherwise desirable.

Also known to be used in the art are inner wire support cages composed of longitudinal wires which extend the length of the filter medium and disposed at the outer apex inside each fold of the filter medium, the ends of each wire being attached, usually by spot welding, to a supporting circle of wire at both top and bottom. A conforming similarly constructed outer cage is used in conjunction with the inner cage, the filter medium being sandwiched between them. U-shaped bulges extend outwardly from the longitudinal wires of the outer cage to circular circumferential wire rings to which they are welded. The outer circumferential ring supports help resist the bowing out of the outer wire supports and filter medium when air jet pulse methods of cleaning are used.

SUMMARY OF THE INVENTION

The present invention relates to a simplified and improved cartridge filter for removing solid particles or dust from a stream of moving gas, including air. The cartridge comprises an inner pleated wire frame support for a correspondingly pleated sheet of filter medium, outer filter medium support wire stays located at the inner apex of each pleat or fold of the filter medium, and end caps into which the ends of the inner wire support frame, filter medium, and outer stay wires are sealed.

The inner wire frame is formed of wires of suitable size, strength, stiffness, corrosion resistance, and other properties, the wires being spaced apart at predetermined intervals and bent into a generally cylindrical shape having a pleated or folded configuration around the cylindrical axis.

A sheet of filter medium of the same length as the inner wire frame is folded or pleated to conform with the folds of the frame and formed into a pleated cylindrical filter supported by the frame. Filter media well known in the art for filtering particles from gas may be used as the filter medium. Woven and non-woven textile fabrics, mats, and felts of natural, synthetic organic, glass, or metal fibrous materials may be used as well as porous polymeric films, sheets, and foams. Composite sheets or films of one or more of the above materials are often used to provide an appropriate porosity to remove particles from the gas and/or to provide strength to resist the filtration pressure of the gas stream and/or the gas pressure of a pulse jet cleaning mechanism or method. The preferred filter material for use in this invention is a composite sheet of porous expanded polytetrafluoroethylene film bonded to a woven or felt textile backing material. The porous expanded polytetrafluoroethylene film is prepared in accordance with one or more of Gore U.S. Pat. Nos. 4,187,390; 4,110,392; 4,096,227; 3,962,153; 3,953,566 and 4,025,679. The non-sticking properties of the polytetrafluoroethylene surfaces of such composites minimize the sticking and consequent build-up of particles being filtered from the gas stream to the filter and also facilitate periodic removal of any filter cake build-up by pulse jet or other cleaning method.

The filter medium is supported against the inner pleated wire frame by wire stays attached at each end to the frame wires and disposed each in an inner apex of a pleat of the ouside of the filter medium. Each end of the outer support wire stay is bent into a shape such that it may be hooked across top or bottom wires of the inner support cage to hold the longitudinal portion of the wire stay firmly in place in the apex of the pleat of the filter medium. Each outer support wire stay is also bent into an initial inwardly curved shape, preferably parabaloidal, such that when one end of the stay wire is attached to the inner wire frame, and the wire stay pressed into the apex of a pleat of the filter medium, and the other end of the stay hooked over a wire at the other end of the inner wire frame, then the spring tension in the wire stay will cause it to press firmly into the apex of the pleat of the filter medium and hold it firmly in place against air pressure impinging on the back side of the filter medium from a pulse jet cleaning apparatus or the like. The use of the bent wire outer support stays is advantageous in that it not only holds the filter medium firmly to the inner wire frame, but no protuberances, bulges, or ledges are present to catch and hold dust against the active filter area. Also, less wire is required than for many other wire support methods known in the art. An alternative form of outer support stay to the bent wire stay is a slightly inwardly bowed stay prepared by rolling or bending flat metal sheeting into a U-shaped or V-shaped or other appropriately shaped cross-section, with the ends left flat for easy attachment to the wires of the inner frame. Further, bent U-shaped or V-shaped stay wires without the flat ends may be bent and held in place by bent round (or other shaped) stay wires placed in the outer grooved side of the stays and the ends of the round wires hooked over the inner support frame wires to hold the combination in place.

The assembled pleated inner support frame, pleated filter medium, and outer support wire stays are then sealed to end caps by means known in the art, such as adhesives or imbedding in rubbers, thermoplastic resin plastisols, or the like. A preferable embodiment for a lower end cap, where minimum accumulation of particles on the protuberances of the filter assembly would occur, would consist of a contoured end cap with the contour following or approximating in shape that of the pleats in the filter medium and inner wire support frame. The end caps can be a metal or plastic cap or the molded thermoplastic resin plastisol and its imbedded components can serve as the lower end cap. This can be made by imbedding or potting the lower end of the filter assembly in the requisite potting material, letting it harden sufficiently to hold its shape, removing the mold, and allowing the potting material to continue to cure to a hard completely cured end cap.

It is, therefore, an object of the invention to provide a simplified cartridge filter which is particularly useful with a pulse jet cleaning system for removing particles or dust from a stream of gas, has a minimum of protruding parts on which dust can collect to reduce the available surface of the filtration medium available for filtering, filters efficiently for long periods between cleaning cycles, is easily cleaned, and is relatively long lasting without requiring replacement.

DETAILED DESCRIPTION OF THE INVENTION WITH REFERENCE TO THE DRAWINGS

Figure 1:
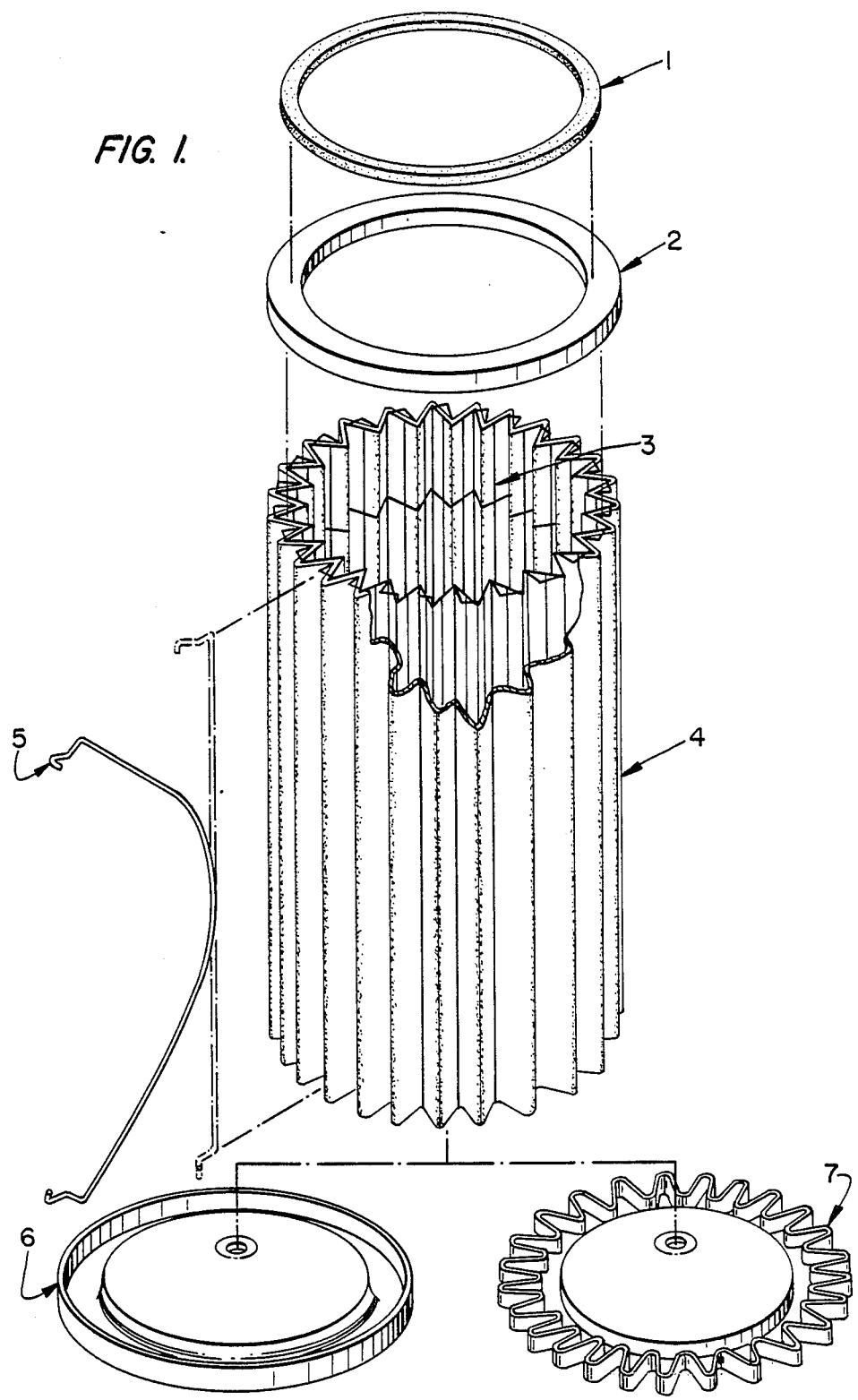
FIG. 1 is an exploded perspective diagram of the cartridge filter of the invention, with a cut away view of the pleated filter medium in the pleats of the inner support wire frame, the placing of the outer wire support stays, and two alternative forms of lower end cap.

The filter cartridge of the invention as shown in FIG. 1 is simply constructed in cylindrical form from a gasketed top end cap, a pleated inner wire support frame for the pleated filter medium, outer support stay wires, and a lower end cap. The top end cap 2 is formed of thin steel, galvanized steel, stainless steel, or aluminum sheet, molded plastic or other materials, and may be stamped, spun, turned, molded, or cast. 24 guage stamped galvanized steel is a preferred material. A gasket 1 of rubber or polyurethane is affixed to the top cap 2 to aid in sealing the cartridge to its mounting means and may be of molded, cast, or strip material. Neoprene (E. I. duPont de Nemours, Inc. trademark) foam rubber is a preferred gasket material. The filter medium support frame 3 may be of welded wire mesh or woven or non-woven screen of steel, stainless steel, galvanized steel, aluminum, or plastic. A preferred embodiment utilizes 14 guage welded wire mesh galvanized steel of 1"×2" or 1"×3 ¼" mesh spacing.

The pleated filter medium 4 is formed from woven or non-woven fabric or felt used either alone or in combination with a porous membrane. The fabric or felt may be of natural or synthetic fibers, organic polymers, metal, etc., and of a porosity and composition appropriate for the size of particles being filtered from the gas stream and the temperature, corrosiveness, and other conditions to be encountered in filtration. Preferred filter media are laminates of porous expanded polytetrafluoroethylene membrane with polyester, conductive polyester, polypropylene, polyaramide, fiberglass, and polytetrafluoroethylene felts and fabrics. The porous expanded polytetrafluoroethylene membranes, felts, and fibers are described in the above references and these and the other preferred felts and fabric are obtained as well-known commercially available materials.

The outside stay wires 5 may be drawn wire of 5 to 12 guage steel, stainless steel, or galvanized steel and are formed preferably in a parabaloid curve so that when one end is hooked to the support frame, the wire pressed into the apex of a fold in the filter medium, and the other end hooked over the other end of the support frame, the tension of the straightened bow in the wire will hold the filter medium in place against air pressure from a jet pulse cleaning device. A preferred example of suitable wire is 9-gauge galvanized steel wire of 65,000–100,000 psi tensile strength. Wire of high tensile strength such as 250,000 psi or above specification may also be used.

Lower end caps 6 and 7 are made from the same materials as and formed similarly to the top end cap. Contoured end cap 7 is particularly suitable for use to avoid build up of dust ledges or piles at the bottom of the cartridge. A molded cap 6 or contoured cap 7 may consist solely of hardened encapsulating or potting material formed or molded about the bottom of the support frame, filter medium, and stay wires to effect a bottom seal and closure to the cartridge. A pre-shaped mold would be filled with encapsulating or potting material of the proper consistency or softness, the assembled cartridge components to be capped pressed into or embedded in the mold, the encapsulating material allowed to cure or harden sufficiently to be self-supporting, the outer mold removed, and the molded bottom end cap allowed to cure or harden completely.

Figure 2:
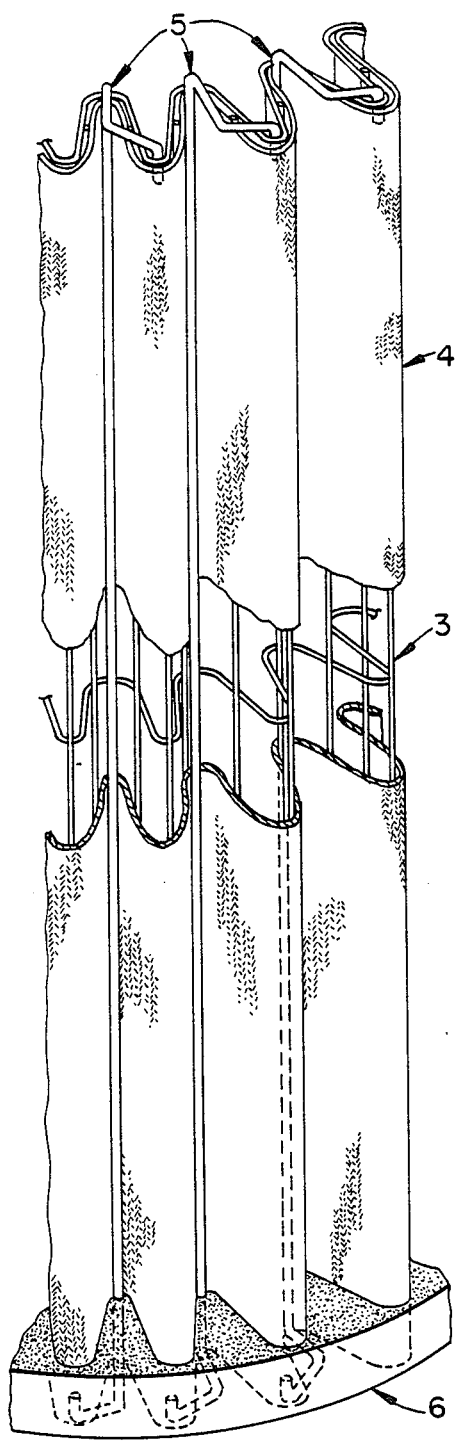
FIG. 2 is a perspective view of details of attachment of the outer support stays to the inner frame, the filter medium cut away to show the pleated inner frame, and a sealed or potted lower end of the cartridge.

FIG. 2 shows how the outer stay wires 5 hook over the wires of the inner frame 3 as well as gives details of the inner support frame 3 and the imbedding of the support frame 3, the filter medium 4, and the outer stay wires 5 in bottom end cap 6.

Figure 3:
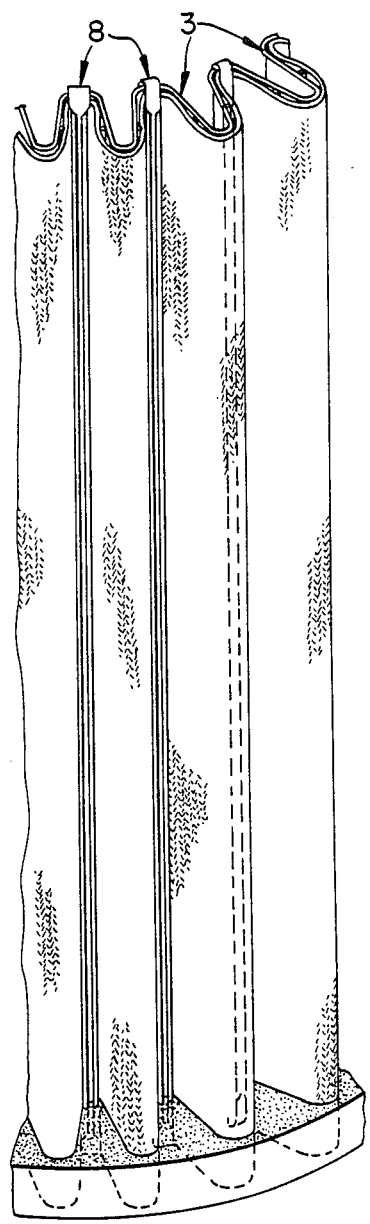
FIG. 3 is a perspective view of the attachment of an alternative outer support stay 8 of V-shaped or U-shaped cross-section to the inner support frame.

FIG. 3 details the attachment of the outer stay wires 8 in the alternative V-shaped or U-shaped cross-section to the inner wire support frame 3 by folding the flat ends over the wire's inner frame 3 by mechanical means.

Figure 4:
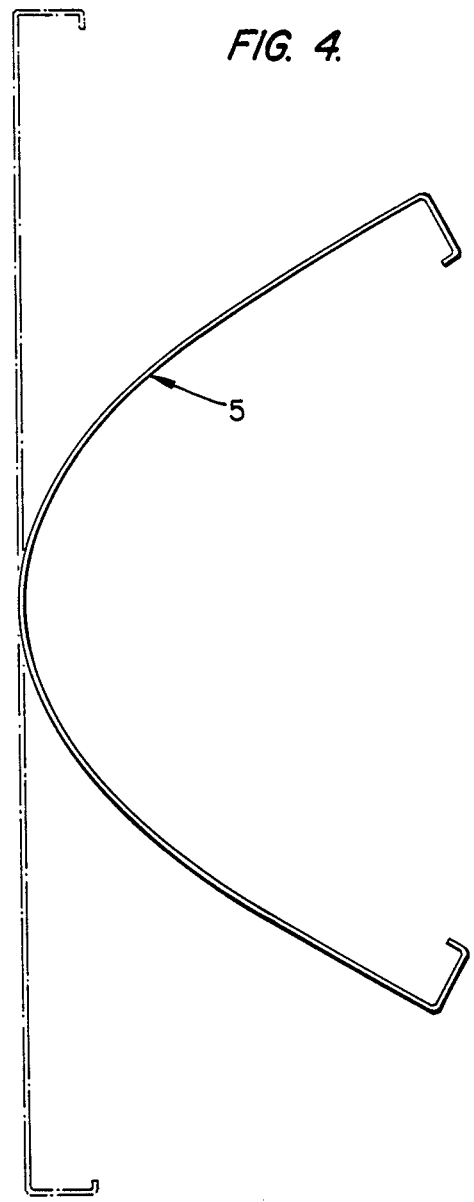
FIG. 4 is a schematic drawing of an outer support wire stay in both bent (before attachment) and straight (after assembly to cartridge) configurations.
Figure 4A:
FIG. 4a is an end view of the outer support stay shown in FIG. 4.

FIG. 4 depicts the shape and FIG. 4a depicts the end detail of outer stay wire 5.

Figure 5:
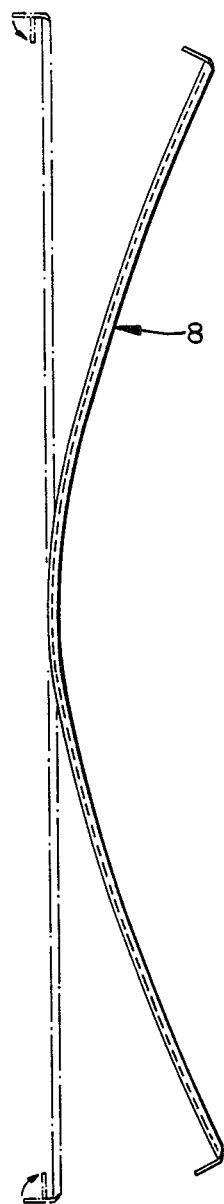
FIG. 5 is a schematic drawing of an alternative outer support stay 8 of V-shaped or U-shaped cross-section.
Figure 5A:
FIG. 5a is an end view of the alternative outer support stay shown in FIG. 5.

FIG. 5 details the alternative form of outer stay wire 8 of V-shaped or U-shaped cross-section. FIG. 5a is an end view showing the U-shaped cross-section. This is formed by bending strips of flat steel to a cross-sectional shape over a mandrel, leaving the ends in flat tab form for subsequent bending over the inner support frame wires for attachment during assembly of the cartridge. The strip is then rolled to a slight bow configuration to provide the springiness needed to exert pressure into the apex of the filter medium as shown above. It is intended that the term outer support wire or stay wire be inclusive of wire of any cross-section which, when in its initially bent form it is straightened into an inner apex of an outer fold of the filter medium and attached at its ends to the wires of the inner frame, will exert pressure on the filter medium to hold it in place and resist the pressure exerted against the filter medium from the interior of the filter cartridge by the forces exerted on it by a pulse jet cleaning device. The stay wire should not, however, have such a shape or cross-section that edges would cause wear or damage to the filter medium from pressure, friction, puncture or the like.

An optional variation of the method of using the stay wires to further hold the stay wires firmly to the filter medium and inner wire frame in this invention is a combination of adhesives with the method of the invention. The longitudinal portion of the stay wires may be coated with an adhesive on the surface of the wire intended to face the filter medium. A commercial grade of either solvent-based urethane or hot-melt polyester adhesive could be used as well as others which will adhere to both the stay wires and to the outer surface of the filter medium being used.

Where exceptional outer stay wire rigidity is desired, a round stay wire is placed in the groove of a U-shaped or V-shaped stay wire, which has been manufactured without the flat ends for subsequent attachment purposes, and the combination of stay wires pressed into an inner pleat of the filter medium, where it is held by hooking the round wire over the wires of the inner support frame in the usual manner. Stay wires of cross-section other than round or circular may be used. The U-shaped or V-shaped stay wire is held firmly in place by the other stay wire and does not ordinarily require other attachment.

The preferred way of sealing the inner support frame, filter medium, and outer support stays into the end caps is by imbedding or potting each end in a matrix of urethane, epoxy, or silicone rubber or in a thermoplastic resin plastisol or other suitable thermoplastic resin. The preferred material is a commercial 2-component polyurethane resin system, such as the PN # DRZ 27141 system available from Isocyanate Corporation.

The improved filtration cartridge of the invention has a number of advantages over many of the cartridges known in the art. The filter medium is supported by a formed wire support frame which prevents the medium from collapsing under pressure and dust loading. The frame also prevents the inside and the outside of the pleats of the pleated filter medium from closing off and thus reducing air flow through the filter cartridge. The use of outer spring stay wires with the inner support frame also keeps the filter medium open by pressing the medium firmly to the wire support frame and prevents the collapse of the pleats to the outside when the filter medium is cleaned from the inside by a high energy air pulse jet. The straight outer stay wire eliminates ledges which allow dust build-up and reduce air flow through the filter cartridge. The alternative form of contoured bottom/lower end cap, the outer periphery of which is shaped to correspond to the pleats of the filter medium and inner wire support frame, also helps to eliminate ledges for dust build-up and the resultant reduction of air flow.

I claim:

1. An improved gas filter cartridge comprising:

(a) an inner pleated wire support frame capable of supporting a correspondingly pleated filter medium;
(b) a pleated filter medium supported on said inner wire support frame;
(c) an outer filter medium-support wire stay disposed at the inner apex of each pleat of said filter medium and;
(d) end caps into which the ends of said filter medium pleats, said inner wire support frame, and said outer filter medium-support wires stays are sealed.

2. A cartridge of claim 1, wherein said outer medium-support wire stays are formed from inwardly curved wires.

3. A cartridge of claim 2, wherein the ends of said outer medium-support wire stays are mechanically fastened to said inner pleated wire support frame.

4. A cartridge of claim 3, wherein the periphery of one end cap has the same contour as said pleated filter medium and said inner pleated wire support frame.

5. A cartridge of claim 4, wherein the mechanically fastened outer stay wires are adhered to said filter medium along the line of contact with said medium.

6. A cartridge of claim 4, wherein said pleated filter medium comprises at least one layer of porous expanded polytetrafluoroethylene.

7. A cartridge of claim 3, wherein the mechanically fastened outer stay wires are adhered to said filter medium along the line of contact with said medium.

8. A cartridge of claim 3, wherein said outer medium-support wire stays further comprise a pair of wires, a first wire disposed in a continuous outwardly facing groove along the length of a second wire, said first wire holding said second wire in place, and only said first wire being mechanically fastened to said inner pleated wire support frame.

9. A cartridge of claim 1, wherein said pleated filter medium comprises at least one layer of porous expanded polytetrafluoroethylene.

* * * * *